United States Patent
Vastardis et al.

(10) Patent No.: US 9,402,405 B2
(45) Date of Patent: Aug. 2, 2016

(54) LIQUID INFUSION PROCESS AND METHOD OF BREWING A BEVERAGE

(71) Applicant: BKON LLC, Newark, DE (US)

(72) Inventors: Dean J. Vastardis, Moorestown, NJ (US); Lou Vastardis, Moorestown, NJ (US)

(73) Assignee: Bkon LLC, Newark, DE (US)

( * ) Notice: Subject to any disclaimer, the term of this patent is extended or adjusted under 35 U.S.C. 154(b) by 49 days.

(21) Appl. No.: 14/083,016

(22) Filed: Nov. 18, 2013

(65) Prior Publication Data

US 2014/0079854 A1    Mar. 20, 2014

Related U.S. Application Data

(63) Continuation of application No. 13/749,411, filed on Jan. 24, 2013, now Pat. No. 8,586,117, which is a continuation-in-part of application No. 12/589,784, filed on Oct. 28, 2009, now Pat. No. 8,383,180.

(51) Int. Cl.

| | |
|---|---|
| A23F 3/18 | (2006.01) |
| A23L 2/38 | (2006.01) |
| A23L 2/04 | (2006.01) |
| C12G 3/00 | (2006.01) |
| A23L 2/54 | (2006.01) |
| A47J 31/44 | (2006.01) |
| A23F 5/26 | (2006.01) |
| A47J 31/043 | (2006.01) |

(52) U.S. Cl.
CPC . *A23F 3/18* (2013.01); *A23F 5/262* (2013.01); *A23L 2/04* (2013.01); *A23L 2/38* (2013.01); *A23L 2/54* (2013.01); *A47J 31/44* (2013.01); *C12G 3/00* (2013.01); *A47J 31/043* (2013.01)

(58) Field of Classification Search
CPC ............. A23F 3/18; A23F 5/262; A23L 2/04; A23L 2/38; A23L 2/54; C12G 3/00; A47J 31/043; A47J 31/44

See application file for complete search history.

(56) References Cited

U.S. PATENT DOCUMENTS

| | | |
|---|---|---|
| 1,674,857 A | 6/1928 | Emerson |
| 1,751,477 A | 3/1930 | Greenwald |
| 1,947,426 A | 2/1934 | Smith |
| 1,952,733 A | 3/1934 | Smith |
| 1,980,735 A | 11/1934 | Smith |
| 2,079,603 A | 5/1937 | Davis |
| 2,181,090 A | 11/1939 | Lucia |
| 2,203,638 A | 6/1940 | Smaltz et al. |
| 2,212,100 A | 8/1940 | Keaton |
| 2,223,450 A | 12/1940 | Jepson et al. |

(Continued)

FOREIGN PATENT DOCUMENTS

| | | |
|---|---|---|
| WO | WO 2010/059251 | 5/2010 |

*Primary Examiner* — Anthony Weier
(74) *Attorney, Agent, or Firm* — Riverside Law LLP

(57) ABSTRACT

A liquid infusion and/or brewing process is described. The process includes the steps of placing a desired amount of an infusion material into a chamber at atmospheric pressure, placing a desired amount of liquid into said chamber, sealing said chamber from the surrounding atmosphere, and applying at least one reduced pressure cycle within said chamber, wherein said at least one cycle includes reducing pressure within said chamber to form at least a partial vacuum within said chamber and subsequently returning said chamber to about atmospheric pressure. Methods for separating the brewing media from the liquid after completion of the brewing process are also described.

29 Claims, 3 Drawing Sheets

(56) References Cited

U.S. PATENT DOCUMENTS

| | | |
|---|---|---|
| 2,232,614 A | 2/1941 | Kopf |
| 2,289,498 A | 7/1942 | Hons |
| 2,312,555 A | 3/1943 | Jepson |
| 2,338,140 A | 1/1944 | States |
| 2,403,404 A | 7/1946 | Scott |
| 2,467,817 A | 4/1949 | Dietz |
| 2,708,398 A | 5/1955 | Mertler |
| 2,845,018 A * | 7/1958 | Turke, Sr. ............ A47J 31/043 210/481 |
| 2,885,294 A | 5/1959 | Larson et al. |
| 3,181,951 A | 5/1965 | Gronvold |
| 5,338,409 A | 8/1994 | Heierli |
| 5,773,067 A | 6/1998 | Freychet et al. |
| 6,068,160 A | 5/2000 | Fancher |
| 6,295,920 B1 | 10/2001 | Barden et al. |
| 6,578,467 B1 | 6/2003 | Taylor et al. |
| 7,032,507 B2 | 4/2006 | Cai |
| 2004/0206245 A1 | 10/2004 | Halliday et al. |
| 2007/0186780 A1* | 8/2007 | Clark ............ A47J 31/32 99/275 |
| 2008/0121112 A1 | 5/2008 | Dworzak et al. |
| 2008/0212403 A1 | 9/2008 | Garman et al. |
| 2009/0165655 A1 | 7/2009 | Aonuma |
| 2011/0226343 A1 | 9/2011 | Novak et al. |
| 2012/0070542 A1 | 3/2012 | Camera et al. |
| 2012/0093990 A1 | 4/2012 | Shrader et al. |
| 2012/0100275 A1 | 4/2012 | Bishop et al. |
| 2012/0219686 A1 | 8/2012 | Bombeck et al. |

* cited by examiner

LIQUID INFUSION PROCESS AND METHOD OF BREWING A BEVERAGE

CROSS-REFERENCE TO RELATED APPLICATION

This application is a continuation of U.S. patent application Ser. No. 13/749,411, filed Jan. 24, 2013, now U.S. Pat. No. 8,586,117, which is a continuation-in-part of U.S. patent application Ser. No. 12/589,784, filed Oct. 28, 2009, now U.S. Pat. No. 8,383,180, both of which are herein incorporated by reference in their entirety.

FIELD OF THE INVENTION

The present invention relates to a beverage machine, and, more particularly, to systems and methods of vacuum brewed or infused beverages.

BACKGROUND OF THE INVENTION

Brewed beverages, such as coffee or tea, are very popular and common among many types of people in various cultures and in numerous countries around the world. Getting the best quality brew in the most efficient manner has been the goal of many coffee and tea brewers for many years.

Over the last two decades the coffee and tea industry has evolved from a commodity based industry to one of specialty products, retail outlets and consumer driven increase of quality and cost. Starbucks Corporation sparked the evolution within the industry in the United States resulting in retail concept and beverage concept innovation, the birth of the US style "Cafe Culture" and consumer demand for better quality coffee products. However, this entire evolution of the coffee industry was built on the methods and technologies developed over 80 years ago.

The French press was invented in the 1850's. The espresso machine was created in 1822. Emerson's vacuum brewer was invented in 1922. Melitta Bentz's coffee filters were invented in 1908. There have been numerous modifications, improvements and automations to these processes and apparatuses over the years. However, despite the explosion of beverage and retail innovation over the last two decades not one significant new brewing/infusing process has emerged.

In 2006 The Coffee Equipment Company launched "the Clover", which is an automated French press, capable of making a hot beverage in less than 60 seconds. The apparatus proved that there is a need for single serving, quick turn over and created a niche in the industry where ultra premium coffees could now be brewed and served by the cup in an acceptable retail turnover rate. The Coffee Equipment Company was soon recognized for their "Clover" by Starbucks and was purchased in 2008. The purchase created a void in the market for a single serving brewer capable of creating ultra premium drinks in under 60 seconds.

The "cold brewing" of coffee and tea has also been practiced for countless years in countries around the world. This process involves the soaking and or brewing/infusing of coffee or tea with room temperature water in a vessel for 12 to 24 hours. This process is considered by many as the optimal method to extracting the right solid from the dried media. However, the process takes too much time for the typical consumer.

The niche created by the "Clover" and the "cold brewing" method became the inspiration for the development of the inventive process and apparatus described herein. The goal was to create a process that could be versatile enough to be used to brew both coffee and tea, as well as to brew using both with hot and cold water. The invention is a completely new and unique process which does not adhere to any of the restrictions or methods of anything that has ever existed. The process, which brews in a vacuum environment, has tremendous range in all the parameters and can be utilized to brew as quickly or slowly, as hot or as cold as desired in less time then conventional methods allow.

The term "vacuum" has been used in the past in connection with the brewing of coffee. For example, in 1922 Emerson was issued U.S. Pat. No. 1,674,857 for a "vacuum" brewing process. This conventional process involves an upper and lower vessel. The lower vessel holds water and is placed above a heat source. The upper vessel holds the dried media or coffee. The upper vessel, resembling a funnel with a long neck, sits atop the lower vessel. The long stem from the upper vessel goes down into the lower vessel below the water level. The two are connected via an airtight seal at the top of the lower vessel and the beginning of the neck for the upper.

When the water is heated it rises through the tube into the upper vessel and saturates the dried media in the funnel of the upper vessel. Once the heat is removed a "vacuum" occurs in the lower vessel as the water vapor contracts as it cools. The resulting vacuum creates a suction which pulls the liquid from the upper vessel back down to the lower vessel. Therefore, the "vacuum" acts as a mechanism to create extract or to suck the liquid through the coffee and filter in order to separate the two. There is no point where the coffee or dried media brew inside a vacuum during the process defined by Emerson. Similar systems are shown in U.S. Pat. No. 6,295,920 to Barden et al. and U.S. Pat. No. 2,467,817 to Dietz.

Automated "vacuum" brewers such as Starbucks's "Clover" operate under the same principal of brewing under normal atmospheric conditions while using suction/vacuum pressure below a filter as a mechanism to separate liquid from solids. There is no suggestion of brewing the water and dried media completely inside a vacuum chamber while negative pressure is occurring.

In 1935 Davis was granted U.S. Pat. No. 2,079,603 that describes a coffee maker wherein a "vacuum" is partially created to aid as a mechanism to create movement within the brewing apparatus. During the brewing process the heating of the water creates steam pressure which actually suspends the upper vessel like a hot air balloon above a steaming pot of water. When the heat is removed the steam pressure cools thus creating a vacuum, allowing the upper vessel, with dried media (coffee) to descend into the hot water. When the vacuum has pulled all available water inside the vessel, outside air is pulled in through the open spouts through the coffee creating a bubbling action.

The liquid in the Davis system is not boiling or bubbling due to a lack of surface pressure, but is bubbling due to the air which is getting pulled in through available vents into the process chamber. Since the entire apparatus is not sealed there is no possibility for the brewing to occur in a stabilized vacuum. Nor is there any mention of the brewing process occurring in a vacuum.

Although coffee, tea and other beverages have not previously been brewed in a vacuum, it has been suggested to use a vacuum to cook other food products. For example, in 1940 Smaltz was granted U.S. Pat. No. 2,203,638 for a "Vacuum Cooking and Cooling" process for the processing of pie fillings, fruit preserves or the similar food products. According to the patent, a vacuum is pulled until all evaporation is complete. This is achieved by continuously running the vacuum pump and expelling the vacated vapor and air while the vacuum component of the process is being applied. There are no one way valves or manual valves that would allow for the vacuum to be regulated at anything other than the maximum capacity of the pump which is −29 Hg in.

As the Smaltz patent states, 29 inches of mercury vacuum will cause the pie filling to rapidly cool thereby halting the cooking process while allowing the product to cool rapidly without separating. He mentions that the vacuum/cooling process is a part of the process to reach a final finished product, whereas the removal of water vapors and temperature is defined as part of the "cooking" and "cooling" process. Cooking is defined as preparing under the application of heat. Therefore, Smaltz is only cooling with a vacuum, not cooking and there is no suggestion therein that his process can be used to brew coffee or tea or other beverage.

U.S. Pat. No. 2,885,294 issued to Larson in 1959 for an invention entitled "Oven and Method of Preparing Food". The patent describes the beginning of the cooking process where a super atmospheric cycle or a "downward displacement" method are utilized to remove ambient air, which is replaced by steam pressure to cook the foodstuff quickly, without contaminants and without "impregnating" or saturating the interior of the foodstuff with water molecules. The ambient air is removed to prevent the loss of vitamins or nutritional elements as well as to avoid the "impregnation" and or saturation of the foodstuff with water molecules during the cooking process.

Larson mentions using a vacuum pump in the beginning of the cooking process for the sole reason of removing ambient air. This void is then filled with the expanding gasses of steam which is heated further by the heated walls of the oven, thus resulting in a positive pressure atmosphere. The cooking, therefore, does not actually take place in a vacuum. Furthermore, there is no suggestion in Larson that his process can be used to brew coffee or tea.

A need clearly exists for a beverage brewing machine and process that can provide a quick and efficient method for brewing or infusing a high quality beverage. It has been found that this can be accomplished by the proper use of a vacuum. To Applicant's knowledge, no one has attempted to brew coffee or tea or other beverage utilizing a vacuum in the chamber in which the beverage is brewed.

SUMMARY

The present invention relates to methods and devices for brewing or infusing beverages. In one embodiment, the present invention relates to a liquid infusion process, comprising placing a desired amount of an infusion material into a chamber at atmospheric pressure; placing a desired amount of liquid into said chamber; sealing said chamber from the surrounding atmosphere; and applying at least one reduced pressure cycle within said chamber, wherein said at least one cycle comprises reducing pressure within said chamber to form at least a partial vacuum within said chamber and subsequently returning said chamber to about atmospheric pressure.

In another embodiment, the present invention relates to a method of brewing a beverage, comprising combining at least one brewing material and a liquid within a sealed chamber; applying a plurality of reduced pressure cycles within said chamber, wherein each of said cycles comprises reducing pressure within said chamber to form at least a partial vacuum within said chamber and subsequently returning said chamber to about atmospheric pressure; and removing at least a portion of said brewing material from said liquid to form said beverage.

In various embodiments of the present invention, the liquid may be placed into the chamber at substantially the same time as the application of a reduced pressure cycle, or the placement of the liquid into the chamber may alternate with the reduced pressure cycles. The alternating cycles of reduced pressure and placement of liquid may increase agitation of the infusion material. Further, the application of a reduced pressure cycle prior to the first placement of liquid in the chamber may increase the rate of infusion when the liquid is subsequently placed into the chamber. In one embodiment, the vacuum source of the present invention comprises a venturi pump.

In various embodiments, the processes or methods of the present invention may further comprise a step for substantially separating the infused liquid from the infusion material. This step may also comprise applying positive pressure to the chamber during the separation of the infused liquid from the infusion material. This step may be a filtration step that is performed using a filter, and may also be automated.

The methods of the present invention may comprise additional steps. The method may comprise adding a gas, such as carbon dioxide ($CO_2$), to the liquid or to the chamber. The gas may be added to the chamber during at least one of the reduced pressure cycles. The method may also comprise rinse or wash steps applied before, during, or after a brewing cycle. For instance, a liquid rinse cycle may be applied during or after a brewing cycle, such that residual infusion material is substantially removed from at least a portion of the chamber. The addition of a liquid rinse cycle after a reduced pressure cycle may rinse suspended infusion material. A liquid wash cycle may be also applied prior to a brewing cycle for the purpose of cleaning the chamber or other portion of the device prior to use. Further, the liquid rinse or wash may be applied via a spray.

A range of temperatures, pressures, and times may be used for the processes of the present invention. The vacuum within the chamber may be maintained in the range of about −2 to −20 inches of mercury (Hg in) during a brew cycle. The chamber may be held at reduced pressure for at least 3 seconds within each cycle. Further, the depth of vacuum used may be variable, i.e. for each reduced pressure cycle the vacuum within the chamber may be higher or lower than the vacuum within the chamber for the previous reduced pressure cycle. The liquid may be in the range of about 175° to about 212° F. when it is placed into the chamber. Alternatively, the liquid may be heated to within a range of about 185° to about 212° F. after it is placed into said chamber. In various embodiments, the temperature of the liquid during a reduced pressure cycle may be at, above, or below room temperature.

The liquid infusion process of the present invention may involve a variety of liquids and infusion materials. For instance, the liquid may comprise water or ethanol. The infusion material may, for example, comprise fruit, herbs, or botanicals.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1, comprising

DETAILED DESCRIPTION

Definitions

Figure 1A:
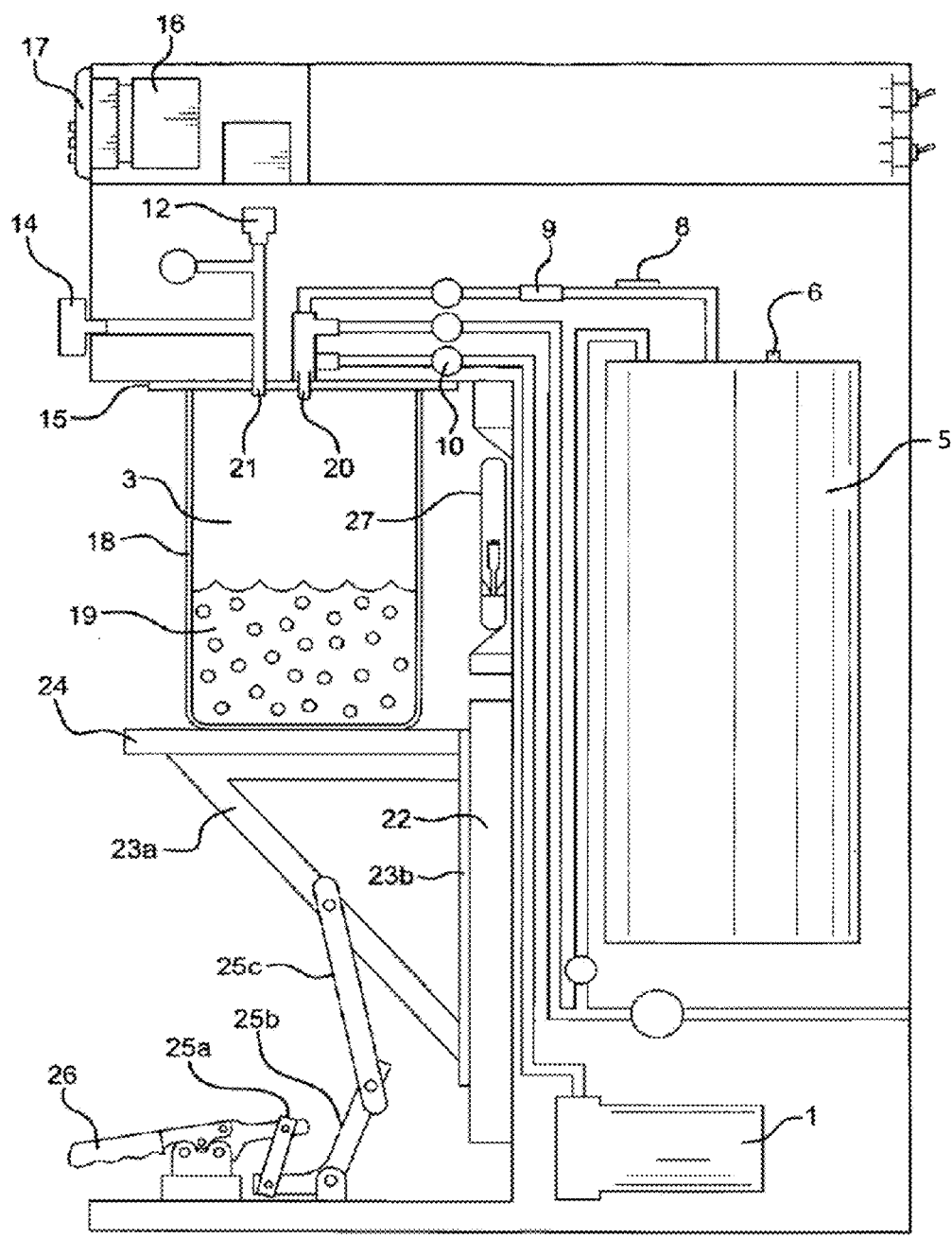
FIGS. 1A and 1B, is a schematic representation of a beverage brewing or infusing machine illustrating features of the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

The term "beverage" as used herein refers to any consumable liquid or drink, and can include, but is not limited to, water, tea, coffee, juice, milk, soda, alcoholic liquids (i.e. liquids containing ethanol) and any other water or alcohol based consumable solution or combination thereof. The term "spirit" as used herein refers to distilled beverages or liquors, such as vodka or gin, and may also refer to undistilled fermented liquids, such as beer, wine, and cider. Beverages may also include any amount of solid phase particulates, such as infusion or brewing materials, as well as trapped or infused gaseous materials.

The terms "infusion material," "brew material," "brewing material," "beverage making material" and the like are used interchangeably herein, and refer to any substance at least a portion of which is extracted into liquid during a brewing or infusion step of the present invention. Examples of such a substance include, but are not limited to: coffee beans or grinds, tea leaves, cocoa, fruit, grains, herbs, spices, botanicals, vegetables, flavor additives, sweeteners or any other materials suitable for consumption. Furthermore, the infusion materials of the present invention can be used fresh or dried (for instance, in the example of fruit); ground or whole (for instance, in the example of coffee beans); or, in general, can be processed or unprocessed prior to use in a brewing or infusion step of the present invention. There are no limitations to the size of infusion or brewing material components, in whole or particulate form, when used with the present invention.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

It is to be understood that the figures and descriptions of the present invention have been simplified to illustrate elements that are relevant for a clear understanding of the present invention, while eliminating, for the purpose of clarity, many other elements found in typical brewing, hardware appliance, and software controlled appliance, apparatuses, systems, and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

Described embodiments of these platforms, engines, systems and methods are intended to be exemplary and not limiting. Reference will now be made in detail to various exemplary and illustrative embodiments of the present invention.

Referring now to the drawings, there is shown in FIG. 1A a schematic representation of a beverage brewing machine constructed in accordance with the principles of the present invention. The entire process for the brewing/infusing dried media such as coffee, tea or herbs, in accordance with the invention, takes place inside a sealed vacuum chamber 3. This chamber 3 may comprise but is not limited to, a vessel 18 as the main body of the vacuum chamber, wherein the hot or cold water and dried media 19 will remain throughout the process. A seal may be created by a top or lid 15 with a gasket of silicone or a similar material to create the airtight seal between the vessel 18 and the lid 15. The lid 15 may have one or more ports, such as shown at 20 and 21, which may be utilized for evacuation of atmosphere, pressure transducers/sensors/switches, gauges, and/or for directing water into the chamber.

Means are also provided for applying pressure between the lid 15 and the vessel 18 to insure that the gasket creates a proper seal. This is accomplished through the use of a lift table having a table surface 24 on which the vessel 18 is placed. The table surface 24 is supported by a frame comprised of an angle bracket 23a and a vertical bracket 23b. The vertical bracket 23b slides in a fixed linear slide support 22 and can be moved up and down through the movement of adjustable arms 25a, 25b and 25c. A hold down clamp 26 holds the table surface 24 with the vessel 18 placed thereon in the upper sealed position as seen the FIG. 1A. The foregoing is, of course, by way of example only. The lift or pressure to achieve a proper seal may be created with the use of many other available lifting mechanisms such as hydraulic or pneumatic pistons, gas springs, screws, pulleys, latches, clamps or twist lock systems known in the art. As should also be readily apparent to those skilled in the art, in lieu of holding the lid 15 still and moving the vessel 18, one could hold the vessel 18 fixed and move the lid downwardly to create a seal or both could move toward the other.

Figure 1B:
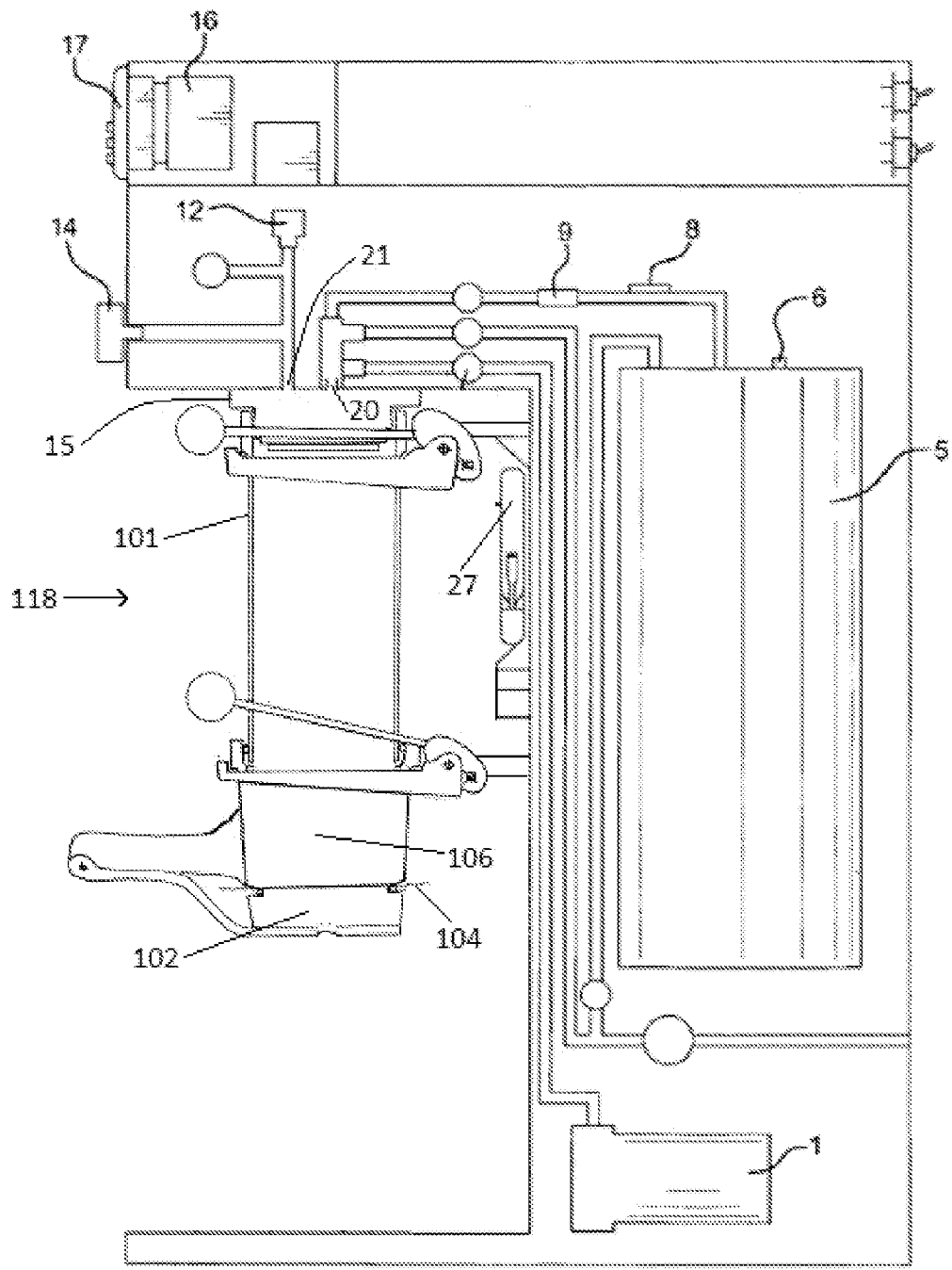

In other embodiments of the present invention, a brew chamber assembly is used instead of a vessel 18 as the main body of the vacuum chamber. Referring to FIG. 1B, one embodiment of a brew chamber assembly 118 is shown, in which brew chamber assembly 118 is be separated into three primary assemblies. The upper brew chamber 101 communicates with the lower brew chamber 106, which in turn communicates with the filter assembly 102. Furthermore, upper brew chamber 101 communicates with lid 15.

In the exemplary embodiment of FIG. 1B, and as discussed throughout, the brewing methodologies referenced herein may provide beverages brewed with tea leaves, coffee grinds, or other insoluble, and generally not ingestible, materials. In order to provide a beverage free of insoluble materials stemming from brew media that may include fine particles, a paper-like filter may be used for each brew cycle, or across more than one brew cycle. For example, a paper filter 104 may be placed between the bottom edge of the lower brew chamber 106 and the filter assembly 102 where a seal with the use of gasket may be created.

Upon completion of the brewing process, which as demonstrated herein may include at least one and preferably a plurality of reduced pressure cycles, paper filter 104 (and, thereby, the remaining undissolved elements) may be removed and discarded. Of course, the removal and discard may be performed manually or may be automated.

Additionally, filter assembly 102 may separate at least a portion of the brewing or infusion material from liquid material during the final dispense of the brewing process, and may allow for separation of lower brew chamber 106 and filter assembly 102 in order to remove the used solids. More particularly, filter assembly 102 may mate with or otherwise engage the bottom of lower brew chamber 106 to provide an air tight seal, and, moreover, filter assembly 102 may hold paper filter 104 in-situ between lower brew chamber 106 and filter assembly 102.

With reference now to FIGS. 1A and 1B, the vessel 18, the lower brew chamber 106, and the upper brew chamber 101 could be in the form of a glass vessel. High temperature tempered glass with properties such as that sold under the PYREX trademark would be most suitable for the invention due to the temperature resistance, transparency and the chemical resistance. The transparency of the glass allows for one to visually inspect the process during the brewing/infusing cycle, while also allowing for a visual/theatrical element which allows not just the operator but the audience/customer an opportunity to see the process to completion. The chemical resistance of the glass is required to ensure that the vessel can be washed after each use without retaining any oils or flavors from the previous brew cycle, so as not to contaminate the beverage. This lack of residual flavors from previous cycles gives the process the ability to brew both coffee and tea without contaminating the taste of the beverages.

The process and apparatus may use an energy source 27 which may create light or heat or both, during the brewing/infusing cycle. Adding light above, below or behind the vessel while brewing creates an illumination of the contents of the vessel. The light allows the operator to inspect and the audience to observe the movement of the liquid and dried media during the brewing/infusing process. This light may also provide necessary heat to help maintain liquid temperature during the brewing/infusing cycle. The heat may be transmitted to the vessel 18, the lower brew chamber 106, or the upper brew chamber 101, and the liquid 19 in order to offset the temperature loss of the liquid when the initial vacuum is evacuated. This heat may be required in order to maintain the proper temperature range of the liquid during the process. It should be appreciated that any type of attached or integrated heat source, as would be understood by those skilled in the art, may be used to heat the liquid either in the brewing chamber, in a liquid reservoir or supply container prior to placing the liquid into the brewing chamber, or both.

In one embodiment, liquid is heated, either prior to its addition to the brewing vessel, while in the brewing vessel, or both before and after being added to the brewing vessel. Depending on the type of beverage being brewed or infused, the liquid may be heated in the range of about 150° F.-250° F., and preferably between 175° F.-212° F. In other embodiments, the liquid may be heated within lower temperature ranges, such as between 75° F.-175° F. It should be appreciated that the present invention is not limited to any particular brewing or infusing temperature, so long as the process achieves the extraction of the desired solids to achieve the desired flavor of beverage. It should be appreciated that the present invention is suitable for brewing or infusing under a controlled vacuum pressure below room temperature, at about room temperature, or above room temperature.

In another embodiment, a "cold brewing/infusing" process achieves the proper extraction of solids via a prolonged brew/infuse time at approximately room temperature while under a controlled vacuum pressure and/or multiple vacuum cycles. As previously noted, cold brewing processes in the prior art typically require long brew times in the range of 12-24 h. The cold brewing process of the present invention can significantly reduce the time for brewing at or below room temperature through the use of reduced pressure and/or vacuum cycles. For example, the cold brewing/infusing process of the present invention can achieve the proper extraction of solids in a range for brew time of 1 min. to 12 hours, and more preferably within a range of 0.5 to 5 hours. A person skilled in the art would recognize that the reduced cold brewing process time afforded by the methods of the present invention makes a cold brewing process more appealing to consumers, while also improving the feasibility and/or efficiency of implementing a cold brewing process on larger scale, i.e. for commercial production using a cold brewing/infusing process.

Additionally, the cold brewing/infusing process of the present invention may also provide the benefit of sanitary, i.e. aseptic or sterile, brewing because the process is carried out in a sealed vessel under vacuum. The cold brewing process of the present invention can reduce or eliminate the introduction of microbes into the beverage during the brewing process because the brew chamber, as described herein, is sealed from the surrounding environment during brewing. The cold brewing process of the present invention can also reduce or eliminate microbial growth during the brew process because the process involves the removal of air via vacuum during brewing. A person skilled in the art would recognize that most spoilage microorganisms are aerobic, and thus the removal of air during the brew process would inhibit microbial growth.

The hot water process requires that the temperature range be maintained within the necessary range throughout the brewing/infusion process in order to properly extract the desired solids. Temperature loss of the hot liquid can occur when a vacuum is created within the chamber 3, when the water begins to boil below temperature and the water vapors are removed. At standard atmospheric pressure, water boils at 212° F. However, a "boiling" effect occurs when the vacuum decreases air pressure above the liquid thus allowing the water to become unstable and "boil" although under 212° F.

The cooler the temperature of the water, the deeper the vacuum needs to be in order to achieve the "boiling" action. Rather than continuously pull a deep vacuum to maintain the "boiling" action of the liquid throughout the process in order to cool and rapidly remove the water vapors from their "foodstuff" as done in the Smaltz's and Larson's processes described above, the process of the present invention is designed to regulate the amount and duration of negative pressure, within the optimal range of vacuum pressures at about −5 to −20 Hg in (inches of mercury) throughout the brewing/infusing process. However, in exemplary embodiments of the present invention, sufficient brewing/infusing pressures may also be regulated within a range of about −1 to −5 Hg in, or at pressures between −20 to −29.9 Hg in.

In embodiments of the present invention where hot liquid is used, the regulation of negative pressure is necessary to allow the hot liquid to boil at the start of the brewing/infusing process in order to start the release of gasses from within the dried media. The "boiling" action in the hot liquid occurs once the vacuum enters the necessary range. This "boiling" action would slow or stop because of temperature loss if the vacuum is not increased, i.e. deepened, in relation to the temperature loss. The release of gasses is created as a result of the pores of the dried media opening up while under the regulated vacuum, allowing liquid to displace the gasses inside the pores of the dried media and resulting in the gasses rising to the surface. This release of gasses continues the agitation and movement of the liquid and dried media, throughout the remainder of the brewing/infusing cycle, which is important for the brewing/infusing process.

In one embodiment, the release of gasses as described herein may eliminate the need to use a deepening vacuum pressure to maintain the movement of the water throughout the brew/infuse cycle, therefore minimizing temperature and water vapor loss, thus allowing the liquid and dried media to stay within the desired temperature range. As pointed out above, a source of energy 27 may also be used, and may provide heat to offset or minimize temperature losses during the brewing/infusing process and to provide light to add a visual aid and or theatrical element to the process, or both.

In an embodiment of the present invention, a liquid distributed into the brewing chamber may be delivered through a spray, wherein the spray means may allow for the flow of liquid to be separated into a plurality of streams which may benefit specific brew media. The streams may also include the addition of gasses to the delivered stream of liquid. The adding of gasses to the liquid mixture while the desired liquid volume comes in contact with the brew media and liquid mass may provide increased turbulence. The addition of gasses may also allow for the expansion of the overall volume of liquid and material, and for further increases during the vacuum cycle. In a preferred embodiment, a gas may be introduced in an even manner and/or by saturating the brew media prior to an atmosphere removal cycle.

The temperature of the liquid for the hot water process may be achieved and maintained by numerous available methods. Methods for heating the water to the desired temperature may include but is not limited to available mechanisms such as hot water holding tanks, as seen in conventional commercial brewing equipment or hot water on demand heat exchange systems, similar to those utilized commercially and in homes which replace traditional hot water heaters. Referring to FIG. 1A, a modified version of the "hot water on demand" system 5 may be used with a variable volume regulating valve 9 (similar to omega.com #FLV400) in order to decrease or increase the contact time of the liquid while passing throughout the heat exchanger/block. Such control of contact time would allow the operator to change the exact temperature of each specific brew cycle for the specific ideal temperatures that the tea or coffee might need to create the best final product. A thermistor 8 may be used to read the temperature of the liquid exiting the heat exchanger, therefore sending the information to the "PLC" 16 or digital control system, which may increase of decrease the flow of the liquid through the heat exchanger in order to regulate to the desired temperature. Whereas, the more traditional hot water holding/heating tanks 5 may achieve the regulation of temperature using available means such as, but not limited to, gas mechanical thermostats or thermocouples 6 in communication with the control unit 16.

The inventive process also requires that there be a means of evacuating the atmosphere from the brew/infusion chamber 3. The process requires that the evacuation of atmosphere is achieved quickly, therefore such available mechanisms as vacuum pumps 1 and a venturi vacuum may be utilized to achieve evacuation in the required time. The preferred apparatus is a vacuum pump 1, purchased from KNF. This pump may be located internally or externally of a housing for the machine depending on mechanical configurations.

The vacuum system may be controlled by a central control unit, such as a PLC 16, or may be controlled with more conventional methods such as timers and relays. The negative pressure may be, but is not limited to, regulated with the use of a mechanical vacuum switch 12 which activates a means of stopping the evacuation, by deactivating the pump or closing a valve, when the desired set point of negative pressure is attained. In the event that there is a leak and pressure inside the chamber rises above the set limit. The vacuum pump may operate in conjunction with electrically controlled valves 10 to avoid starting and stopping the pump if needed to maintain proper pressure during the cycle. A vacuum gauge 14, visible to the operator, can be used to show the pressure within the chamber 3.

The basic mechanical functions of all process parameters can be controlled individually through low tech available mechanisms such as timers, thermostats, relays and mechanical switches and buttons. However, the system may be automated by controlling process parameters through the use of a central control unit such as a PLC 16 (programmable logic controller) with external visual displays 17 and buttons. The central control unit can allow for greater accuracy with each process parameter. In addition to the basic control of process parameters, the central control unit can add the capability to allow for the creation of specific brewing parameters or "recipes" for individual coffees, teas, or herbs. This may allow the user to program a specific name of the product to be brewed and the exact parameters such as, but not limited to, water temperature, vacuum pressure, brew time, hold times, and liquid volumes.

The Central control unit may also allow the apparatus to be linked into a network via, Ethernet or Wi Fi. This connectivity may allow access via the local network or remote access to data such as a variety of accounting information, error codes, service alerts, as well as the ability to change or alter standard system process parameters and add or edit "Recipes".

As should be readily apparent from the forgoing, the apparatus described above is used in the following manner. The desired amount of ground coffee, tea, herbs, fruit or other material is placed in the chamber 3 of the glass vessel 18. The vessel is then placed on the moveable table top 24 while it is in its lowered position. The table top is then elevated until the upper edge of the vessel 18 seals against the top 15. Once the top is sealed, the desired amount of hot liquid, for example, water in a temperature range of about 185°-212° F., is introduced into the chamber 3 through the port 20. (In lieu of introducing hot water into the chamber, it is also possible to provide an arrangement wherein cold or tap water is used and the combined water and brewing material are then heated to the desired temperature while in the chamber 3.) Thereafter, a vacuum is drawn in the chamber 3 by activating valve 10 and/or turning on vacuum pump 1 which also communicates with the chamber 3 through port 20.

The vacuum within the chamber 3 is held within a range of about −2 to −20 Hg in, preferably within the optimal range of about −5 to −20 Hg in. Using the energy source 27 or some other external heat source, the liquid within the chamber 3 is maintained at the desired temperature of about 185°-212° F. Alternatively, it has been found that good results are achieved if the vacuum is pulsed or cycled. That is, after the dried media is mixed with the liquid, it is put under a vacuum for a desired time period, such as for about 5 seconds, and then brought back to atmospheric pressure for approximately 30 to 60 seconds. The vacuum is then reapplied for about another 5 seconds. The values listed above for the number or duration of vacuum pulses are by way of example only, as the process is not limited to these on/off times or to the number of pulses that may be applied during each brewing cycle. For example, in various embodiments of the present invention, the number of vacuum pulses or cycles can be 1 or more than 1, such as at least 2, 3, 4, 5, etc. Similarly, the value for the duration of vacuum application can be more or less than 5 seconds, such as 1, 2, 3, 4, 6, 7, 8, 9, 10, 12, 15, 20, etc. Likewise, the value for the duration of time that the system is maintained at approximately atmospheric pressure, i.e. between applications of vacuum, can be less than 30 seconds, more than 60 seconds or somewhere between 30 and 60 seconds, such as 5, 10, 25, 75, etc. As should be readily apparent, the Central control unit can be used to control the brewing cycle and the number and duration of pulses as desired.

In one embodiment of the present invention, the magnitude of each vacuum cycle in a series of vacuum cycles may be different than the previous cycle. For example, each vacuum cycle in a series of vacuum cycles may be deeper than the previous cycle, i.e. the vacuum becomes progressively deeper with each successive cycle. Utilizing different vacuum depths at different points in the brew/infusion process can be beneficial to the brew extraction. For instance, after each vacuum cycle, the liquid may cool, requiring the next vacuum cycle to be deeper than the previous cycle in order to maintain the same level of "boiling action" or extraction activity from cycle to cycle. By way of a non-limiting example, in the first cycle in a brew/infusion process the vacuum applied is about −5 Hg in. In the second cycle, the vacuum applied is about −7 Hg in. In the third cycle, the vacuum applied is about −9 Hg in, and so on, i.e. the vacuum is deepened with each successive cycle. Alternatively, the vacuum may be decreased, i.e. weakened, with each consecutive cycle, or may be increased or decreased with every other cycle. In various embodiments, the magnitude of vacuum applied for each consecutive cycle may change throughout the brew/infusion process, and can be higher, lower, or the same as the previous cycle. Accordingly, such changes in vacuum magnitude may be programmed to follow any pattern from cycle to cycle, as may be contemplated by one with reasonable skill in the art.

By way of non-limiting example only, brewing certain teas with the brewing cycle described above may take approximately 20-60 seconds. The cycling between negative and atmospheric pressure during such a period of time may allow for desirable soluble elements, such as sugars and polyphenols (antioxidants), to be extracted from the tea without using extraction aids, and may limit the extraction of undesirable elements, such as tannins, into the brewed result, for example. For example, Jade Cloud, a Japanese tea variety, is traditionally brewed at about 180° F. for about 180-240 seconds, but using the present invention allows for brewing at about 195° F. for about 65 seconds. An Iron Goddess of Mercy, for example, is traditionally brewed at about 195° F. for about 140-180 seconds, but using the present invention allows for brewing at 207° F. for about 65 seconds. Similarly, a Bai Hao Oolong, for example, is traditionally brewed at about 190° F. about for 35-120 seconds, but using the present invention allows for brewing at about 207° F. for about 65 seconds.

By way of further example, a Wuyi Oolong is traditionally brewed at about 200° F. for about 240 seconds, while using the present invention allows for brewing at about 207° F. for about 65 seconds. Further, a Golden Yunnan Organic, for example, is traditionally brewed at about 212° F. for about 240-300 seconds, while using the present invention allows for brewing at about 207° F. for about 65 seconds. Similarly, an Ancient Shu Pu-erh (vintage 2009), for example, is traditionally brewed at about 212° F. for about 180-240 seconds, while using the present invention allows for brewing at about 207° F. for about 88 seconds (which includes a pre-rinse of the tea). A Blueberry Rooibos, for example, is traditionally brewed at about 195° F. for about 300-420 seconds, while using the present invention allows for brewing at about 207° F. for about 65 seconds (which includes a pre-rinse of the tea). Of course, this and all embodiments herein may be used with cold brewing methods and known to those skilled in the art and as described herein.

The examples above indicate the typical difficulties of certain ingredients requiring long brew times that are likely to arise in a commercial setting. In addition to more optimal extraction of soluble materials into the brewing medium, as discussed above, the present invention allows for commercially reasonable brewing cycle times, as well as providing increased product consistency (given the low variability in brew time), which is remedial for the aforementioned typical difficulties that arise from brewing in commercial settings—especially for high volume restaurants and coffee houses, for example. As will be discussed further herein, these advantages are also desirable in the home-use market.

In addition to commercial uses, the present invention may allow for a home or personal brewing device. Present day devices are either very convenient to use but provide a low quality of brewing, or offer a very good brewing process but at the cost of convenience to the consumer. The present invention provides both convenience (via at least the very short brew times) with unmatched quality and consistency (via at least the brewing process described above).

In an embodiment of the present invention, the water fill and vacuum cycle may occur at substantially the same time. Although atmosphere removal may typically occur after the desired liquid volume has been added to the brew mass, as the volume of desired liquid is added to the chamber, the vacuum may be allowed to build in the present invention. Such a technique may allow for reduced overall brewing process time, lower water temperatures as the desired liquid enters the chamber, and removal of unwanted gasses from the target media, all while adding the desired amount of water.

Similarly, in an embodiment of the present invention, vacuum cycles may alternate, such as to allow for a partial filling of the chamber with the desired liquid, the application of a vacuum cycle, and a second or further addition of remaining liquid(s), additional liquids, or the like. As will be appreciated by those skilled in the art, the cycles can be repeated to allow for as many alternating cycles as desired, and may include, or not include, a vacuum draw per cycle. Likewise, vacuum cycles may be provided at alternate vacuums per cycle. For example, with regard to a series of three cycles having only a single vacuum cycle, the percentage of total water added before the vacuum cycle may be a function of the amount and type of the media to be brewed. The remaining amount of water which will be added after the vacuum process may be similarly dependent.

Cycling in this manner may force down the desired media on the surface of the liquid present, may add to the amount of agitation of the target media. Further, and more particular to media such as coffee, for example, as the atmosphere is removed, a media may release compounds and gases. For example, coffee may expel $CO_2$ during atmosphere removal, which may result in the water and media mixture expanding higher in the brewing chamber, allowing for greater agitation and increased brewing.

Furthermore, the water added after the vacuum is released may provide for an increase in extraction of compounds from the media. This can occur through the raising of the brewing mass temperature, the lowering of soluble concentrations (providing an increased potential from equilibrium), and thus may allow more solubles to be extracted, thereby forcing the brew material which may be at the surface of the liquid down into the mass, and thereby increasing the agitation which occurs upon delivery of the additional liquid.

Furthermore, the addition of water or liquid to the system, and more specifically, after a vacuum cycle, may help rinse suspended brew material, resulting from the expansion of the liquid and media during atmosphere removal, from the inner brew chamber walls after the at least partially applied vacuum is released and as the chamber equalizes with ambient pressure. After such cycling, it is preferable that at least a majority of material remaining in the chamber should be removed from the chamber walls to ensure that the subsequent batch is not contaminated by material from the previous batch. For example, the present invention may also provide a stream of water or liquid which may be sprayed onto the interior chamber walls to rinse down the material, i.e. a liquid rinse cycle. This liquid rinse cycle may be applied before, during, or after a brewing cycle, such that residual infusion material located on the brew chamber walls may be substantially removed from the walls and/or redirected to another part of the system.

In an embodiment of the present invention, the amount of time before a vacuum is applied may vary based upon the target media to be brewed and may affect the amount of compounds released by the media. For example, a hold time of an additional 2-50 seconds, and more particularly such as 20 seconds, prior to the application of a vacuum cycle may allow for the release of flavor elements not otherwise released between the cycles.

Similarly, reducing the atmosphere of the brewing chamber prior to the addition of the brewing liquid, or at least a substantial portion of the brewing liquid, may increase the rate at which the liquid infuses the media. For example, lowering the pressure prior to introducing the brewing liquid may remove unwanted gas(es) from the target material, which may allow subsequent vacuum cycles, for example, to perform better extraction.

In an embodiment of the present invention, a water rinse cycle may proceed any brewing cycles if, for example, the media to be brewed requires a rinse to wash unwanted components out of the brewing cycle(s). More specifically, certain media may require a pre-brew cycle rinse/brew be used in order to wash off undesirable taste elements. This process may consist of adding desired water volume, and additionally of one or more of the following steps: holding at atmospheric pressures for desired time; removing desired atmospheres for a desired time; separating the water from the brew media so that the media is free from the liquid; and disposing of the pre-brew liquid. Then the unit may be prepared for a full brew cycle.

In an embodiment of the present invention, once the vacuum brewing process is complete, the media may be separated by means of passing the liquid through a thin mesh or paper filter in order to separate the liquid from the remaining solids. The separation may require adequate pressure to push the liquid through the remaining undissolved material and the filter to a one-way valve opening, for example. During this separation, a means of pulsing of positive pressure may be utilized. For example, positive high and low pressure settings may create pressure variation, which may increase and release pressure on the material, thereby adding additional extraction to the brewing process after vacuum brewing has occurred. Positive pressure may be applied in various ways, as would be understood by a person with reasonable skill in the art. For example, positive pressure could be created by supplying a gas, such as air, carbon dioxide or nitrogen, to the brew chamber or vessel of the present invention. In one exemplary embodiment, the positive pressure applied should sufficiently separate the liquid from the remaining solids. For example, the applied pressure may be between 1-10 psig, or in another example, the applied pressure may be greater than 10 psig.

In other embodiments, the methods and apparatus described herein may be used with a pre-packaged pod-type delivery system, such as a KEURIG brewing system or the like, or with pre-packaged beverage pods, such as K-CUP packs or the like. Generally, in such brewing systems, a single serving of beverage is brewed by passing hot water through a container that has been pre-packaged with brew material and a filter. In one embodiment of the present invention, a person with reasonable skill in the art could modify the apparatus of the present invention to use pre-packaged beverage pods, instead of using loose brewing or infusion material in the brewing chamber, in order to perform the methods of the present invention. In another embodiment, a person with reasonable skill in the art could modify a pre-packaged pod-type delivery apparatus to perform the methods of the present invention, for instance, by modifying the apparatus to apply negative or positive pressure to the pre-packaged beverage pods used in the apparatus and/or by modifying the pre-packaged beverage pods to accommodate changes in pressure or temperature.

In an embodiment of the present invention, in order to create an optimal brew free of insoluble materials with specific brew media with fine particles, a new one of the paper like filters may be used for each brew cycle. Upon completion of the brewing process, the paper and the remaining undissolved elements may be removed and discarded. This process may be performed manually or may be automated.

Figure 2:
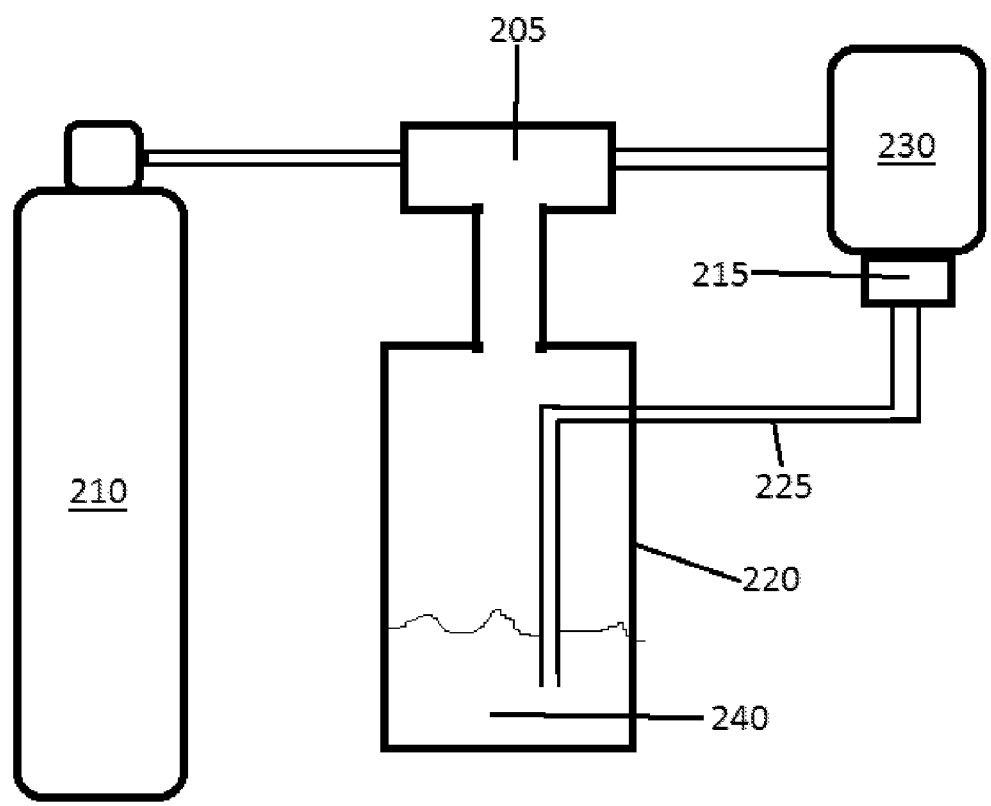
FIG. 2 is a schematic representation of a portion of a beverage brewing or infusing machine illustrating features of an embodiment of the invention.

FIG. 2 is a schematic system diagram illustrating a beverage infusion system in accordance with the present invention. As illustrated, the system may infuse a beverage with compounds from fruits, botanicals, and/or other food-safe desirable additives. In an embodiment of the present invention, an at least partial vacuum may be created within canister 220 through valve 205. In addition to using a vacuum pump as described above, the present invention may utilize other principles, such as venturi principles, to effect a pressure change on canister 220. As illustrated in FIG. 2, a gas such as $CO_2$ may flow from tank 210 through valve 205, which may be venturi orientated, into tank 230, producing at least a partial vacuum in canister 220 when valve 215 is at least partially closed. Such a closed system may allow for greater control of the vacuum created and may allow for the conservation of gases used in the system.

Cycling of vacuum pressure may be controlled by valve 205 and/or optional valve 215. If, for example, $CO_2$ is the gas used, as the vacuum builds the return of the gas into canister 220 through tube 225 may allow for a releasing of the vacuum and/or greater infusion of the material and liquid mixture 240.

Further, the vacuum may be sufficiently reduced so as to allow for the incorporation of a gas through tube 225 into the mixture 240. Using $CO_2$ as the example, the present invention may allow for the production of a carbonated beverage by infusing the mixture 240 with the $CO_2$.

As discussed herein, a brewing process utilizing this embodiment of the present invention may be used to infuse water, spirits, or liquids generally, such as by infusion with natural extracts from fresh or dried fruit. By way of non-limiting example, fruit (fresh or dried) may be placed in a canister 220 wherein water may be added. A vacuum may then be applied to the solution containing the water and fruit material—a cycling process which may be repeated to enhance the extraction and such as is discussed herein. The infused solution may be dispensed through the following ways, by way of non-limiting example: directly after the required vacuum cycles are complete, $CO_2$ is added to the infused liquid; after the required vacuum cycles are complete, additional water is added to the infused solution; and/or the initial infusion water has a higher temperature to thus increase the infusion process, while the secondary water may be delivered at an ice-cold temperature to chill the beverage and reduce the temperature for delivery. Further, for example, at any point in the processes discussed herein, such as after the additional water is added to an infused the liquid, the solution may be carbonated.

Further, in an embodiment of the present invention and as referenced above, spirits, or other consumable liquids, may be introduced into the brewed mixture during processing and/or for infusion. For example, the present invention may allow for the infusion of spirits (for example, vodka) with natural extracts from fresh or dried fruit. By way of non-limiting example only, fruit (fresh or dried) may be placed in a sealable environment (canister 240) along with an alcoholic liquid. The environment may be sealed and a vacuum applied to the solution containing the alcoholic liquid and fruit material—and the vacuum may be repeated/cycled to enhance the extraction. The post-brewing process may be combined with the immediate application of a chilling device or methods to immediately reduce the temperature of the solution, such as the application of ice or an instant chiller sleeve and/or another chilling environment.

Similarly, spirits may be added in a brewing process in order to infuse a brewed beverage. For example, a spirit may be infused, such as during or following a vacuum cycled brewing process, into, for example, a tea or coffee brew. In various embodiments of the present invention, spirits may be infused into a beverage such that the final product is at least 2% alcohol, i.e. ethanol, by volume. For example, in one embodiment, beer comprising about 2-12% alcohol by volume (ABV) may be infused. In another embodiment, wines, typically comprising 9-16% ABV, may be infused. In another embodiment, liqueurs, typically comprising 15-55% ABV, may be infused. In yet another embodiment, other spirits, such as rum, brandy, or grain alcohol, with alcohol content of 60% ABV or higher, may be infused.

After the coffee, tea or other beverage has brewed for the desired amount of time, the heat and vacuum are turned off and the chamber is returned to atmospheric pressure. The table top 24 is then lowered to release the vessel 18. The contents of the chamber can then be strained by any traditional means such as by using French press screens or paper filters.

The separation of liquid and media may also occur as an automated step in the process. This process would occur once the brewing is complete and the vacuum is released. The pump 1 could then activate and, through proper valving, pressurize the brew chamber, forcing the liquid through a screen below the coffee grounds or other media and out a one way valve in the bottom of the chamber. Such a step would, of course, require a modified brew chamber that includes a one way valve in the center of the base and a screen to cover the inside bottom of the vessel in order to separate the solid media from the liquid during the dispensing process.

There are numerous alternative embodiments for the cycling discussed above, such as the amount of liquid used, and the amount of vacuum applied (which may vary by amount and/or type of material to be brewed). For example, coffee may be brewed using just a single vacuum cycle, but may be brewed with more than one water-additive cycle. For example, regardless of the number of cycles, the volume of water used may be less than the amount used in the finished product. Enough water may be employed to effectively brew the selected material with water added to the final beverage after the brewing process is completed. For example, four (4) ounces of water may be used in the vacuum brewing process for coffee, while an additional eight (8) ounces of water may be added to the brewed product to create a final twelve (12) ounces of coffee. Thereby, an espresso may be optionally provided, or a coffee, or a cappuccino (such as wherein espresso may be initially brewed, followed by a brew with milk). In short, the amount of water used during the at least one vacuum cycle may vary and is dependent upon the amount of material being brewed and/or the desired strength of the final product (although the addition of water may be used to control the concentration of the final product).

As discussed above, the brewing cycle of the present invention may allow for brewing times approximately one-fifth of standard brewing times. Such a reduction in time may allow for the brewing of commercial offerings that would otherwise have an undesirable brewing time or that typically cannot be satisfactorily brewed in a practical manner. For example, the increase in sugar extraction and reduction in tannin extraction by the present invention over traditional brewing methods, as described above, may allow a consumer of the brewed beverage to limit or exclude any addition sweetener(s) that would otherwise be necessary to mask the taste of tannins and/or supplement the amount of sugars in the beverage. Thus, beverages brewed using the present invention may, if packaged as an end product, such as a bottled iced tea, contain less added sweetener(s) and/or less calories, and/or may maintain taste and quality without need of sweeteners or other additives.

In addition, using bottled iced tea as an example, the present invention may allow for the production of bottled teas which contain about nine (9) times more polyphenols than standard commercially sold bottled teas. In short, the present invention may allow for a bottled tea which has reduced tannins, higher levels of natural sugars and antioxidants, while offering a greater array of tea choices. For example, a local café may brew and bottle iced teas for sale in their establishment and/or for sale to other local vendors.

Although these may be produced at anytime, given the short brewing times discussed above, employees of a commercial café who may be experiencing a slow down in foot traffic may engage in the brewing and bottling of beverages on-site (teas in this example). Such impromptu activity may allow the employee to become more effectively utilized and may allow for a targeted and efficient offering of packaged beverages. For example, the local café may be able to control production very closely given the near instantaneous evaluation of consumer demand based on prior sales, local weather, actual inventory and real-time consumption data, for example. Production control may include the shear volume of product produced and/or the type of product produced.

Further, such brewing process may be combined with various methods of commercial bottling and beverage stabilization that protects flavor and nutritional shelf life. For example, tea, herbs, and/or fruit (fresh or dried) may be placed in a sealable environment (canister, etc). Water may be added to the sealable environment that contains the fruit material. The brewing environment may be sealed and a vacuum may be applied to the solution containing the water and fruit material—this may be repeated to enhance the extraction.

Before the infused solution is dispensed, additional water, or other liquid, may be added to the infused solution. The initial infusion liquid may have a higher temperature to increase the infusion process, while the secondary addition of liquid may be delivered at a colder temperature to chill the beverage and reduce the temperature. For instance, the secondary addition of liquid may be delivered at a temperature in the range of 32°-50° F. Additives may also be used that protect flavor and nutritional shelf life of the beverage.

Given the brew times possible with the present invention, choices with regard to the type of beverages produced may be made with great efficiency and responsiveness to consumer demand, not only holding inventory at optimal levels, but also minimizing waste of unsold and expired product (expired product may be product older than 45 days, for example), especially when using very expensive starting materials, such as rare teas, for example. Where traditional methods have failed, the real-time "batch" production of the present invention enables production of cold-storage beverages at the point of sale and eliminates external ordering processes, delivery of goods, and maintenance of a remote production facility, for example.

Although many examples of tea and coffee brewing have been provided herein, the present invention may be used to brew any beverage where water, spirits, or liquid generally is used to extract certain bodies from a particular medium. For example, hops, barley and malt, alone or in combination, may be brewed and/or steeped for use alone or as a part of a beverage combination. The present invention may shorten the steep time often associated with processing hops, barley and/or malts for use in beverages, and may allow for improved extraction and flavor qualities over traditional processes. For example, traditional steeping times may range from 20 to 40 minutes at about 150° F. to about 170° F., for example, wherein the present invention may provide steeping in about 6 to 10 minutes at about 180° F. to about 220° F.

In an embodiment of the present invention, the regulation of vacuum cycles may be in direct relationship to the optimal extraction of coffee solubles of 18-22% of the total 30% of the solids available for targeting to be dissolved from given coffee matter (as defined by the Specialty Coffee Association of America and the Specialty Coffee Association of Europe). The extraction is measured through charting of the total dissolved solids, provided by testing the brewed beverage with a digital refractometer, and charting of the data in the use of the Brewing Control Chart, as used by the SCAA and SCAE. By way of example, the total dissolved solids of a brewed beverage may be analyzed using the methods and apparatus described in U.S. Pat. No. 7,952,697 issued to Fedele et al. (Coffee Refractometer Method and Apparatus).

For example, in an embodiment of the present invention, the optimal vacuum depth to utilize for hot brewing to obtain 18-22% extraction may be from 3-14 psig. Vacuum ranges and cycles with lower times and depth may result in sub 18% extraction ranges therefore resulting in a less than favorable extraction rate. However, vacuum ranges and cycles with higher times and depth may result in greater than 22% extraction which will result in a greater than favorable extraction rate.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A liquid infusion process, comprising:
    placing a pod comprising an infusion material into a chamber;
    placing a desired amount of liquid into said chamber;
    sealing said chamber from the surrounding atmosphere; and
    applying at least one reduced pressure cycle within said chamber, wherein said at least one cycle comprises reducing pressure within said chamber to a first pressure and subsequently raising pressure within said chamber to a second pressure.

2. The liquid infusion process of claim 1, wherein the pod is placed into the chamber at atmospheric pressure.

3. The liquid infusion process of claim 1, wherein the liquid is placed into the chamber at atmospheric pressure.

4. The liquid infusion process of claim 1, wherein the liquid is placed into the chamber at a pressure less than atmospheric pressure.

5. The liquid infusion process of claim 1, wherein the liquid is placed into the chamber at a pressure greater than atmospheric pressure.

6. The liquid infusion process of claim 1, wherein the first pressure is in the range of about −2 to about −29 inches of mercury.

7. The liquid infusion process of claim 1, wherein the second pressure is atmospheric pressure.

8. The liquid infusion process of claim 1, wherein the second pressure is in the range of about −2 to about −29 inches of mercury.

9. The liquid infusion process of claim 1, further comprising adjusting pressure within said chamber to a third pressure.

10. The liquid infusion process of claim 9, wherein the third pressure is atmospheric pressure.

11. The liquid infusion process of claim 9, wherein the third pressure is in the range of about −2 to about −29 inches of mercury.

12. The liquid infusion process of claim 1, wherein the liquid is heated prior to placing the liquid into said chamber.

13. The liquid infusion process of claim 12, wherein the liquid is heated to at least 75° F. prior to being placed in said chamber.

14. The liquid infusion process of claim 12, wherein the liquid is heated to the range of about 150° F. to about 250° F. prior to being placed in said chamber.

15. The liquid infusion process of claim 14, wherein the liquid is maintained within a temperature range of about 150° F. to about 250° F. during said at least one pressure cycle.

16. The liquid infusion process of claim 1, wherein at least one additional desired amount of liquid is placed into said chamber during or after said at least one pressure cycle.

17. The infusion process of claim 16, wherein at least a portion of the at least one additional desired amount of liquid is applied via a spray.

18. The liquid infusion process of claim 1, wherein pressure is reduced within said chamber via a venturi pump.

19. The liquid infusion process of claim 1, wherein water vapor is used to preheat said chamber.

20. The liquid infusion process of claim 1, further comprising removing infused liquid from said chamber.

21. The liquid infusion process of claim 1, further comprising removing said pod from said chamber.

22. A liquid infusion process, comprising:
   connecting a pod comprising an infusion material to a chamber, wherein an opening in said pod is in communication with an opening in said chamber;
   placing a desired amount of liquid into said chamber and/or said pod;
   sealing said chamber and said pod from the surrounding atmosphere; and
   applying at least one reduced pressure cycle within said chamber and said pod, wherein said at least one cycle comprises reducing pressure within said chamber and said pod to a first pressure and subsequently raising pressure within said chamber and said pod to a second pressure.

23. The liquid infusion process of claim 22, further comprising removing infused liquid from said chamber and/or said pod.

24. The liquid infusion process of claim 23, wherein said infused liquid is removed from said chamber and/or said pod via a second opening in said pod.

25. The liquid infusion process of claim 22, wherein the liquid is placed into the chamber at atmospheric pressure.

26. The liquid infusion process of claim 22, wherein the liquid is placed into the chamber at a pressure less than atmospheric pressure.

27. The liquid infusion process of claim 22, wherein said chamber is sealed from the surrounding atmosphere prior to placing the infusion material into said chamber, after placing the infusion material into said chamber, or after placing the liquid into said chamber.

28. The liquid infusion process of claim 22, wherein at least one additional desired amount of liquid is placed into said chamber during or after said at least one pressure cycle.

29. The liquid infusion process of claim 22, further comprising adjusting pressure within said chamber to a third pressure.

* * * * *